United States Patent
Joos (10) Patent No.: US 12,515,157 B2
(45) Date of Patent: Jan. 6, 2026

(54) FILTER ELEMENT AND FILTER SYSTEM

(71) Applicant: MANN+HUMMEL GmbH, Ludwigsburg (DE)

(72) Inventor: Bernd Joos, Lorch (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 265 days.

(21) Appl. No.: 18/111,752

(22) Filed: Feb. 20, 2023

(65) Prior Publication Data

US 2023/0201750 A1    Jun. 29, 2023

Related U.S. Application Data (63) Continuation of application No. PCT/EP2021/072843, filed on Aug. 17, 2021.

(51) Int. Cl.
*B01D 46/00* (2022.01)
*B01D 46/52* (2006.01)

(52) U.S. Cl.
CPC ..... *B01D 46/0006* (2013.01); *B01D 46/0041* (2013.01); *B01D 46/0087* (2013.01); *B01D 46/0097* (2013.01); *B01D 46/521* (2013.01); *B01D 2271/022* (2013.01); *B01D 2277/20* (2013.01); *B01D 2277/30* (2013.01); *B01D 2279/40* (2013.01); *B01D 2279/60* (2013.01)

(58) Field of Classification Search
CPC ............ B01D 46/0006; B01D 46/0041; B01D 46/0087; B01D 46/0097; B01D 46/521; B01D 2271/022; B01D 2277/20; B01D 2277/30; B01D 2279/40; B01D 2279/60

USPC .......................................................... 55/500
See application file for complete search history.

(56) References Cited

U.S. PATENT DOCUMENTS

| | | |
|---|---|---|
| 2006/0168920 A1 | 8/2006 | Cassell et al. |
| 2010/0186596 A1 | 7/2010 | Miller et al. |
| 2011/0023427 A1* | 2/2011 | Srinivasan ....... F02M 35/02416 55/385.3 |
| 2016/0090946 A1 | 3/2016 | Tomlin et al. |

(Continued)

FOREIGN PATENT DOCUMENTS

| | | | |
|---|---|---|---|
| CN | 108371848 A * | 8/2018 | ......... B01D 46/0019 |
| CN | 110234414 A | 9/2019 | |
| DE | 102004036083 A1 | 2/2006 | |

(Continued)

OTHER PUBLICATIONS

Office Action in corresponding Chinese Appln. No. 202180050938.2, Apr. 18, 2025, 8 pages, China.

*Primary Examiner* — Jennifer Dieterle
*Assistant Examiner* — Qianping He (57) ABSTRACT

A filter element for filtering a fluid is provided with at least one filter bellows with a first areal inflow surface for a first fluid flow of the fluid and at least one second inflow surface for a second fluid flow of the fluid separate from the first fluid flow of the fluid. The at least one second inflow surface is separate from the first areal inflow surface. A flow channel section for the second fluid flow of the fluid is provided. At least one compensation element is arranged in the flow channel section for the second fluid flow of the fluid at a raw side of the filter element. A filter system with a filter housing is provided with such a filter element arranged exchangeably in the filter housing.

20 Claims, 8 Drawing Sheets

(56) References Cited

U.S. PATENT DOCUMENTS

2018/0117514 A1\* 5/2018 Schmid .................. B01D 53/04

FOREIGN PATENT DOCUMENTS

| DE | 102008036913 B3 | * | 11/2009 | ......... B01D 46/0006 |
|----|----|----|----|----|
| DE | 102014007284 A1 | | 11/2015 | |
| DE | 102017011876 A1 | | 8/2018 | |
| DE | 102017211090 A1 | | 1/2019 | |
| JP | 2008232111 A | | 10/2008 | |
| JP | 2014125880 A | | 7/2014 | |
| WO | 12025455 A1 | | 3/2012 | |

\* cited by examiner

FILTER ELEMENT AND FILTER SYSTEM

CROSS-REFERENCE TO RELATED APPLICATIONS

This application is a continuation application of international application No. PCT/EP2021/072843 having an international filing date of 17 Aug. 2021 and designating the United States, the international application claiming a priority date of 19 Aug. 2020 based on prior filed German patent application No. 10 2020 121 711.0, the entire contents of the aforesaid international application and the aforesaid German patent application being incorporated herein by reference.

BACKGROUND OF THE INVENTION

The invention concerns a filter element for filtering a fluid, in particular for use for cassette air filters of an internal combustion engines or as cabin air filters, in particular of a motor vehicle, as well as a filter system with a filter element.

In practice, particle filters are used for filtering out particulate contaminants contained in gaseous fluids, for example, air. The particle filters comprise a filter housing with an inlet for the fluid to be filtered and with an outlet for the filtered fluid. According to one construction, the filter housing comprises an insertion opening for a filter element in order to position the latter in an insertion compartment in the interior of the filter housing. The filter element arranged in the insertion compartment can therefore be flowed through in filter operation by the fluid to be filtered along a main flow axis, preferably from bottom to top. A seal device of the filter element enables the required sealing seat of the filter element in the filter housing so that an undesirable leakage or bypass flow of the gaseous fluid to be filtered about the filter element is counteracted in filter operation.

DE 10 2008 036 913 B3 describes an air filter system with a flat plate-shaped filter element that is of a configuration as compact as possible and that still provides measures in order to counteract clogging of the filter element with snow and/or ice. Such an air filter system provides a frame into which a filter element of a plate-shaped configuration can be inserted which comprises a raw air side, a clean air side arranged substantially parallel thereto, and narrow sides extending substantially perpendicularly thereto, and with a housing in which the frame together with filter element can be inserted. In case that the filter element provides a rectangular base surface, a total of four narrow sides are provided, two parallel extending longitudinal narrow sides and two transverse narrow sides extending perpendicularly to the longitudinal narrow sides, respectively. Moreover, a bypass valve is provided through which, in the open state, warm air can flow into the region positioned between the housing or the frame and at least one narrow side in such a way that the warm air flows from there through the narrow side into the filter element and out of the filter element through the clean air side.

SUMMARY OF THE INVENTION

It is an object of the invention to provide an improved filter element for filtering a fluid that counteracts clogging of the filter element with suspended particles from the fluid.

A further object is to provide a filter system for filtering a fluid for receiving such an exchangeable filter element.

The aforementioned objects are solved according to an aspect of the invention by a filter element for a filter system with at least one filter bellows, with a first areal inflow surface for a first fluid flow as well as at least one second inflow surface for a second fluid flow separate from the first fluid flow, wherein the second inflow surface is separate from the first inflow surface, and wherein at least one compensation element is arranged in a flow channel section of the second fluid flow at the raw side.

Beneficial embodiments and advantages of the invention result from the further claims, the description, and the drawing.

A filter element for filtering a fluid is proposed with at least one filter bellows, with a first areal inflow surface for a first fluid flow as well as at least one second inflow surface for a second fluid flow separate from the first fluid flow, wherein the second inflow surface is separate from the first inflow surface. In this context, at least one compensation element is arranged in a flow channel section of the second fluid flow at the raw side.

The separation between first and second inflow surfaces is advantageously fluid-tightly embodied, in particular embodied at least sufficiently fluid-tightly. In this context, sufficiently fluid-tight means that the separation under normal operating conditions is designed to be fluid-tight such that the function of the filter element is practically not disturbed. "Normal operating conditions" means that the incoming fluid flow, in particular the incoming airflow, is under normal atmospheric pressure and is not blown in at excess pressure. A leakage is tolerable when the function of the filter element is practically undisturbed, i.e., the leakage does not allow larger particles to pass than the medium of the filter element.

The filter bellows can be designed in particular as one piece so that the two inflow surfaces are formed in a single filter bellows of one filter medium. Alternatively, it is however also possible that the two inflow surfaces are realized in two different filter bellows with the same or with different filter media, which can be arranged so as to adjoin each other in the filter element.

Beneficially, by means of the filter element a filter system can be provided that permits a beneficial variant formation with or without suspended particle valve. In this way, components can be dispensed with so that no additional injection molding tools are required when injection molding is employed for producing the filter system.

Advantageously, the compensation element can be designed to be flowed through by the fluid. Fluid can pass through while suspended particles in the fluid such as, for example, snow, water or the like, can be retained. In this way, for the actual filtration task of the filter element, a larger filter surface is available because the filter bellows does not become clogged with suspended particles from the fluid.

The compensation element compensates tolerances in the filter element and, as needed, can keep suspended particles away from the second inflow surface at the raw side of the filter element.

The flow direction for a flat filter is oriented, for example, perpendicularly to the inflow surface and outflow surface. Preferably, in a filter with erected folds, the inflow surface and the outflow surface form the surfaces in which the fold edges are positioned, respectively.

For the filter element according to the invention, which, for example, can be embodied as a molded-on plastic frame filter element (MPF element), in addition to the main filtration region with a first inflow surface of the filter bellows, a further filtration region with a second inflow surface is present which serves for connecting a further intake location of a fluid, for example, air. The connection of the further intake location can be realized at the end face and/or by a rim segment of a separated region at the molded-on plastic frame filter element with a partial deflection of the second fluid flow. The rim segment in this context is an areal element within the filter bellows near the circumference or adjoining the circumference of the filter bellows. For example, the first and the second inflow surface can be parallel to each other.

The separate further filtration region at the MPF element can be located in this context at the rim but also inside of the filter element. It is also possible to provide a plurality of further filtration regions with further inflow surfaces. They can be embodied for same or for different connection directions.

Such an embodiment of the filter element comprises significant advantages compared to the prior art describing, for example, snow valve solutions with filter elements of paper which may have a nonwoven attached at the filter element at the raw air side, the nonwoven sealing directly a further inflow channel. The filter element according to the invention comprises a separate inflow surface. The latter can be separately provided with a compensation element, in particular a compensation element that can be flowed through by the fluid. The filter medium of the compensation element can be e.g. a nonwoven. Via the second inflow surface of the further filtration region, a separate second fluid flow which can also be heated, for example, can be supplied. In this manner, it is possible to filter different air flows with a molded-on plastic frame filter element. As filter bellows, for example, a filter bellows of a zigzag-folded nonwoven can be employed.

The separate further filtration region of the filter element for the second inflow surface can be designed as a chamber separated from the first fluid flow. For this purpose, a separation element can be provided. A wall of the chamber can thus effectively prevent that a flow over to the main filtration region with the first inflow surface occurs. The chamber can be realized, separated by a rib as a separation element, in a stepped fold region of the actual filter bellows.

As needed, it can be advantageous to use at least two different filter bellows with different filter media for the two inflow surfaces so that each filter bellows comprises an inflow surface which are then separated from each other by the separation element. In this way, it is possible, for example, that the filter bellows of the first inflow surface is embodied as a folded filter and the filter bellows of the second inflow surface as a nonwoven layer. The folded filter comprises a significantly higher filtration surface than the nonwoven layer so that the functional division into a main filtration region for the normal operation for the regular flow, when the first inflow region is freely passable, and into an auxiliary filtration region for the flow in emergency situations, when the first inflow region is clogged, is accounted for.

The second fluid flow can be realized with heated air. The filter element can be operated in an emergency operation via the second inflow when the first inflow is clogged by suspended particles in the fluid, for example, by snow. The compensation element can then take on an additional filter function.

The compensation element, which is preferably configured to be flowed through and which can be embodied as a nonwoven but, for example, also as an elastomer, ensures due to its elasticity a tolerance compensation during assembly of the filter element. The compensation element can be attached, for example, by means of adhesive beads on the actual filter bellows or at the frame of the filter bellows.

Advantageously, the filter element can be embodied as a drawer filter element for a lateral insertion into a filter housing. However, it is also possible to insert the filter element from above into an opened filter housing, and the filter housing is subsequently closed by a housing cover.

The compensation element can also be injection molded together with the injection molding process for forming a frame around the filter bellows in order to obtain in this way a tolerance compensation and/or an efficient coverage even of the second inflow surface.

According to an advantageous embodiment, at least one separation element can be arranged in the filter bellows between first and second inflow surfaces. In this manner, it can be effectively prevented that a first fluid flow, which is to reach substantially only the first inflow surface, reaches the second inflow surface and thus could possibly clog the second inflow surface with suspended particles from the fluid. The fluid flow for the second inflow surface, in turn, can flow preferably through this part of the filter bellows which is therefore free of clogging, for example, by snow.

According to an advantageous embodiment, the compensation element can be arranged in or at a rim segment at the rim of the filter element. The connection of the further intake location can thus be realized via the rim segment of a separated region at the molded-on plastic frame filter element with a partial deflection of the second fluid flow and can thus be accommodated in a beneficial manner with regard to installation space.

According to an advantageous embodiment, the compensation element can be arranged in or at an end face of the filter element. The connection of the further intake location can thus be realized via the end face of a separated region at the molded-on plastic frame filter element with or without a partial deflection of the second fluid flow and can thus be accommodated in a beneficial manner with regard to installation space.

According to an advantageous embodiment, the separation element can be connected fluid-tightly in relation to the first fluid flow, preferably sufficiently fluid-tightly at least under normal operating conditions, to a cover element for areal coverage of the second inflow surface. In this context, the separation element, the cover element, the compensation element and/or the frame can be embodied, for example, as a chamber. The cover element can be formed, for example, of plastic material. The separate further filtration region of the filter element for the second inflow surface can be designed as a chamber which is separated in relation to the first fluid flow. In an optional embodiment, no separate cover element is provided, wherein separation element, compensation element and/or frame can form the chamber. A wall of the chamber can thus effectively prevent that a flow over to the main filtration region with the first inflow surface occurs. The chamber can be realized, for example, separated by a rib, in a stepped fold region of the actual filter bellows.

According to an advantageous embodiment, the at least one filter bellows can be folded in a zigzag shape to folds with parallel fold edges sequentially following each other in a length extension of the filter bellows and each extending between oppositely positioned end face edges of the filter bellows. In this context, a continuous frame can be molded circumferentially around the at least one filter bellows. When two different filter bellows for the two inflow regions are arranged in the filter element, a continuous frame can also be molded circumferentially around both filter bellows together. Such a filter element can be advantageously used as an air filter, for example, of an internal combustion engine, and represents an inexpensive and efficient solution of an air filter. Due to the molded-on frame, the filter element can be easily mounted and also exchanged, as needed.

According to an advantageous embodiment, the separation element can be arranged parallel to the folds of the filter bellows. The parallel arrangement of the separation element relative to the folds provides a fluidically beneficial solution. Optionally, the separation element can also be arranged at a slant inclined relative to the folds.

According to an advantageous embodiment, the compensation element can be connected to the filter bellows and/or to the frame. In this manner, an effective coverage of the second inflow surface by means of the compensation element can be achieved so that the second fluid flow is forced to flow through the compensation element. Also, the compensation element cannot be accidentally stripped off during mounting.

According to an advantageous embodiment, the compensation element can be formed of a nonwoven. A nonwoven represents an inexpensive and easily mountable solution for the compensation element. Due to the elasticity of the compensation element, advantageously a tolerance compensation can be achieved during assembly of the filter element. When the compensation element is designed to be flowed through, it can also effect a filtration of the fluid. A further beneficial alternative is an elastomer as a compensation element which, due to its elasticity, advantageously can effect a tolerance compensation during mounting of the filter element.

According to an advantageous embodiment, the filter bellows can comprise an inflow side and an oppositely positioned outflow side which, in the region of the further filtration region, comprise a different spacing of the second inflow surface in relation to the first inflow surface, in particular a reduced spacing. Due to the different thickness of the filter bellows between the main filtration region in the region of the first inflow surface and the further filtration region in the region of the second inflow surface, the second fluid flow can be supplied beneficially through a chamber as fluid channel section to the second inflow surface. Also, a valve, for example, designed as a check valve, can be accommodated beneficially with respect to installation space in the region of the filter bellows in this way so that installation space problems can be advantageously reduced in this manner.

According to an advantageous embodiment, the frame with filter bellows can be embodied as a drawer filter element. A drawer filter element represents an easy mounting solution for the integration of the filter element in a filter system and can also be easily exchanged in a servicing situation. The drawer filter element can be inserted transversely to the flow direction into a filter housing. Alternatively, it is however also possible to insert the filter element from above into a housing bottom part which can be closed subsequently by a housing cover.

According to a further aspect, the invention concerns a filter system for filtering a fluid with a filter housing and a filter element for filtering a fluid exchangeably arranged in the filter housing between a raw side and a clean side, with at least one filter bellows, with a first areal inflow surface for a first fluid flow as well as at least one second inflow surface for a second fluid flow, wherein the second inflow surface is separated sufficiently fluid-tightly from the first inflow surface. In this context, at least one compensation element is arranged at the raw side through which a flow channel of the second fluid flow from a raw-side inlet extends to the second inflow surface. The filter housing comprises a first inlet for inflow of the first fluid flow to the first inflow surface and at least one second inlet for inflow of the second fluid flow to the at least second inflow surface.

In the filter element of the filter system according to the invention, which, for example, can be provided with a molded-on plastic frame filter element (MPF element), in addition to the main filtration region with a first inflow surface of the filter bellows, a further filtration region with a second inflow surface is provided which serves for connecting a further intake location of a fluid, for example, air. The connection of the further intake location can be realized at the end face and/or via a rim segment of a separated region at the molded-on plastic frame filter element with a partial deflection of the second fluid flow.

The filter bellows can be designed in particular as one piece so that the two inflow surfaces are formed in a single filter bellows of one filter medium. Alternatively, it is however also possible that the two inflow surfaces are realized in two different filter bellows with the same or with different filter media, which can be arranged so as to adjoin each other in the filter element.

The separated further filtration region at the MPF element can be located in this context at the rim but also within the filter element. It is also possible to provide a plurality of filtration regions for different connection directions.

Such an embodiment of the filter element comprises significant advantages compared to the prior art which, for example, describes snow valve solutions with filter elements of paper in which a nonwoven is attached at the filter element at the raw air side, the nonwoven sealing directly a further inflow channel. The filter element according to the invention comprises a separate inflow surface which can be provided separately with a compensation element, such as a nonwoven, an elastomer or the like, through which a separate second fluid flow can be supplied which can also be heated, for example. In this manner, it is possible to filter different air flows with a molded-on plastic frame filter element. As a filter bellows, for example, a zigzag-folded filter bellows of a nonwoven can be used.

According to an advantageous embodiment, the flow channel can extend from the raw-side inlet to the second inflow surface across at least a part of a filter element end face. The connection of the further intake location can thus be realized via the end face of a separated region at the molded-on plastic frame filter element with or without a partial deflection of the second fluid flow and can thus be accommodated beneficially with respect to installation space.

According to an advantageous embodiment, the flow channel can extend from the raw-side inlet to the second inflow surface via at least a part of a filter element rim segment. The connection of the further intake location can thus be realized via the rim segment of a separated region at the molded-on plastic frame filter element with a partial deflection of the second fluid flow and can thus be accommodated beneficially with respect to installation space.

According to an advantageous embodiment, separation element, cover element, compensation element and/or frame can be embodied as a chamber. The separate region of the filter element for the second inflow surface can thus be formed as a chamber which is separated in relation to the first fluid flow. In an optional embodiment, no separate cover element is provided, wherein cover element, compensation element and/or frame can form the chamber. A wall of the chamber can thus prevent effectively that a flow over to the main filtration region with the first inflow surface occurs. The chamber can be realized, separated by a rib, in a stepped fold region of the actual filter bellows.

According to an advantageous embodiment, in a housing part, for example, in a housing bottom part, a flow chamber with a valve, for example, embodied as a check valve, can be formed for the second fluid flow. In this manner, it can be effectively prevented that in normal operation the first fluid flow flows in through the second inflow surface; instead, this occurs only when the first inflow surface is clogged. In this way, a reliable function of the filter system in normal operation with filtration as effective as possible in the region of the first inflow surface can be achieved.

According to an advantageous embodiment, a valve can be arranged at the second inlet. For reasons of installation space, the valve can be beneficially combined with the second inlet so that a filter system as compact as possible can be realized. Also, a reliable function of the filter system in normal operation with filtration as effective as possible in the region of the first inflow surface can be achieved.

According to an advantageous embodiment, an inflow of the fluid through the valve can be designed to be pressure-controlled or can be designed to be controlled by a flow resistance. In this way, it can be advantageously achieved that a second fluid flow enters the flow channel of the second inflow surface only in case of clogged first inflow surface, because a corresponding vacuum is created thereby in the filter system. The region of the second inflow surface in the filter element is thus used only in emergency operation while a first fluid flow flows only through the first inflow surface in normal operation.

According to an advantageous embodiment, the filter element can be designed as a drawer filter element that is inserted or can be inserted transversely to the main flow axis of the fluid into the filter housing. Advantageously, the filter bellows can be designed as a flat filter bellows. The bellows of a flat filter provides a beneficial configuration for an air filter and can be used advantageously in particular as a drawer filter so that beneficial installation space conditions result.

According to an advantageous embodiment, the filter housing can comprise an insertion compartment with a frame guide for the filter element by means of which the filter element, via an insertion opening of the filter housing, can be inserted into the insertion compartment so that a seal of the filter element rests circumferentially seal-tightly against a housing seal surface. A drawer filter element represents an easy mounting solution for the integration of the filter element in a filter system and can also be easily exchanged in a servicing situation. Alternatively, it is however also possible to insert the filter element, for example, from above, into a housing bottom part of a filter housing that can be closed subsequently by a housing cover.

The described filter system can be used advantageously as an air filter, in particular as an air filter of an internal combustion engine or as a cabin air filter, in particular of a motor vehicle.

BRIEF DESCRIPTION OF THE DRAWINGS

Further advantages result from the following drawing description. In the drawings, embodiments of the invention are illustrated. The drawings, the description, and the claims contain numerous features in combination. A person of skill in the art will consider the features expediently also individually and combine them to expedient further combinations.

DESCRIPTION OF PREFERRED EMBODIMENTS

In the Figures, same or same-type components are identified with the same reference characters. The Figures show only examples and are not to be understood as limiting.

Figure 1:
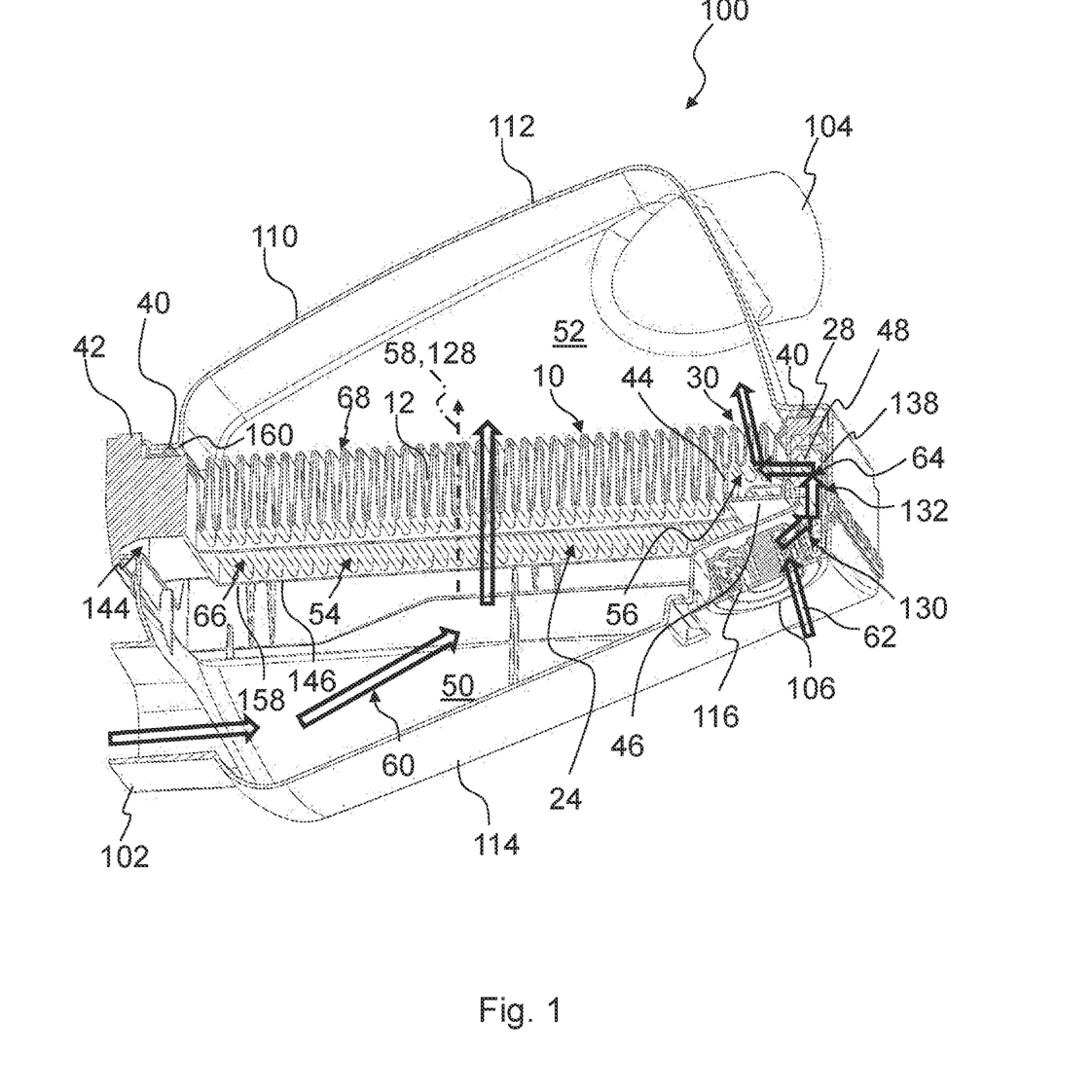
FIG. 1 shows a sectioned isometric illustration of a filter system with mounted drawer filter element according to an embodiment of the invention with an inflow via of a rim segment of the filter element.
Figure 2:
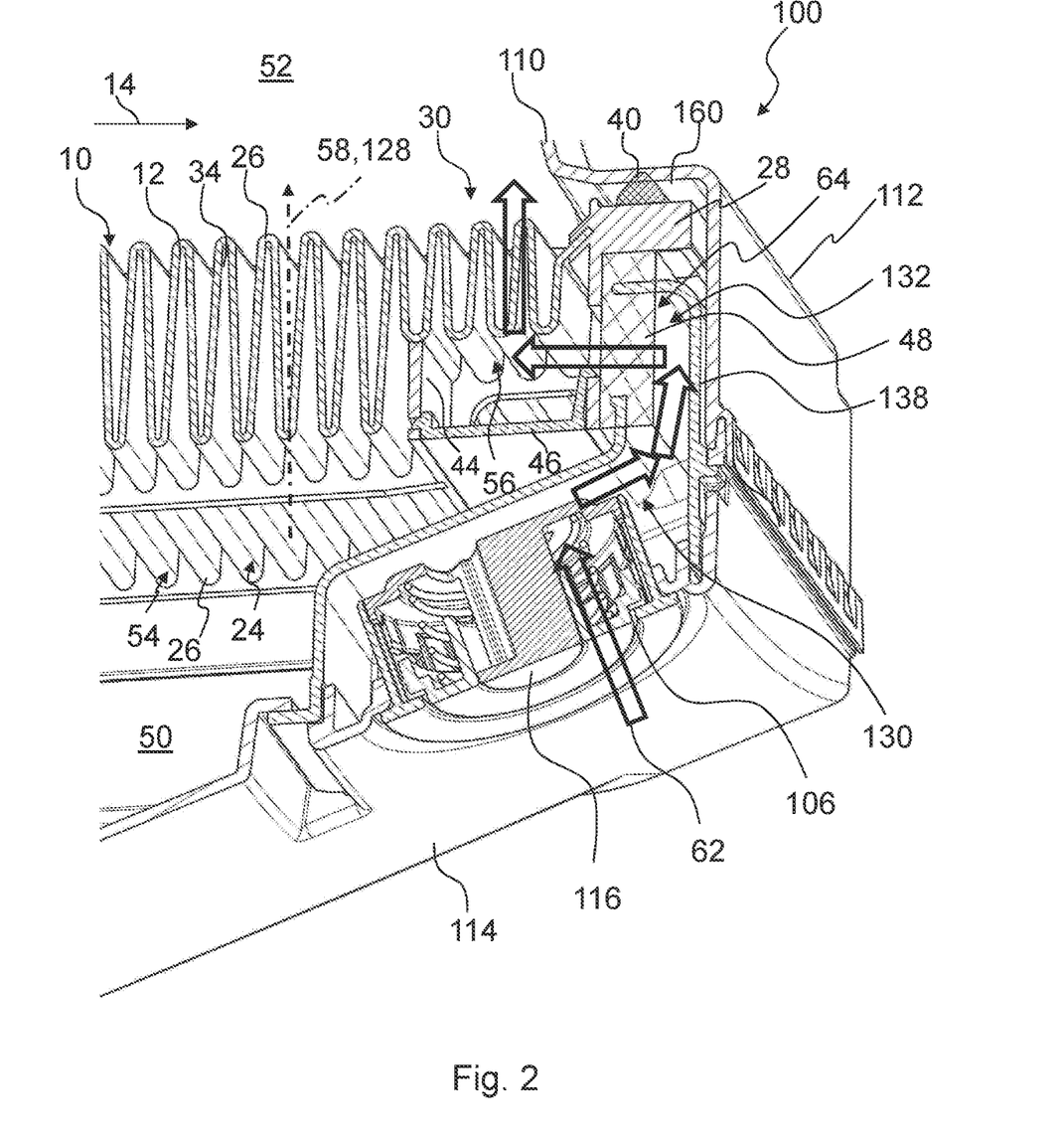
FIG. 2 shows a detail view of the filter system according to FIG. 1 in the region of the second inflow surface.

FIG. 1 shows a sectioned isometric illustration of a filter system 100 with mounted drawer filter element 10 according to an embodiment of the invention with an inflow via a rim segment 30 of the filter element 10, while in FIG. 2 a detail view of the filter system 100 according to FIG. 1 in the region of the second inflow surface 56 is illustrated. The rim segment 30 can be flowed through along a flow direction 58 as well as at a slant thereto.

The filter system 100 comprises a filter housing 110 with a housing bottom part 114 and a housing cover 112 as well as a filter element 10 for filtering a fluid arranged exchangeably in the filter housing 110 between a raw side 50 and a clean side 52. The filter element 10 comprises in this context a filter bellows 12, for example, one-piece filter bellows, with a first areal inflow surface 54 for a first fluid flow 60 as well as a second inflow surface 56 for a second fluid flow 62 separate from the first fluid flow 60. The fluid flows 60, 62 are indicated by arrows. The first fluid flow 60 flows through the inlet 100 of the housing bottom part 114 into the filter housing 110 at the raw side 50 and flows then via the first inflow surface 54 through the filter bellows 12 to the clean side 52. Through the valve 116, the second fluid flow 62 flows into the flow chamber 132 (see FIG. 3) in the housing bottom part 114 and, along the flow channel 130 and a flow channel section 64, through the compensation element 48, which preferably can be flowed through, via the second inflow surface 56 through the filter bellows 12. Both fluid flows 60, 62 exit again through the outlet 104 from the filter housing 110. The second inflow surface 56 is sufficiently fluid-tightly separated from the first inflow surface 54 by the separation element 44. At the raw side upstream of the second inflow surface 56, a compensation element 48 is arranged herein through which a flow channel 130 of the second fluid flow 62 extends from a raw-side inlet 106 to the second inflow surface 56. In this context, the compensation element 48 is arranged in the flow channel section 64 of the second fluid flow 62 upstream of the second inflow surface 56 at a rim segment 30 of the filter element 10. The flow channel 130 thus extends from the raw-side inlet 106 to the second inflow surface 56 via at least a part of the rim segment 30.

The filter housing 110 comprises a first inlet 102 for inflow of the first fluid flow 60 to the first inflow surface 54 and a second inlet 106 for inflow of the second fluid flow 62 to the second inflow surface 56.

The separation element 44 is arranged parallel to folds 34 of the filter bellows 12 so that a flow resistance as minimal as possible results by the separation element 44 itself. The separation element 44 is connected fluid-tightly in relation to the first fluid flow 60 to a cover element 46 for areal coverage of the second inflow surface 56. In this way, the separation element 44, the cover element 46, the compensation element 48, and the frame 28 are embodied as a chamber. With the filter element 10 mounted, the compensation element 48 adjoins directly the end face of the opening 118.

The compensation element 48 which can be embodied as a nonwoven is connected to the filter bellows 12 and the frame 28. Due to its elasticity, the compensation element 48 serves in this context as tolerance compensation when mounting the filter element 10 in the filter housing 110. At the same time, the compensation element 48 takes on a sealing function in relation to the flow channel 130.

The filter bellows 12 comprises an inflow side 66 and an outflow side 68 positioned opposite thereto which comprise a reduced spacing relative to each other in the region of the second inflow surface 56 in relation to the first inflow surface 54, which means that the filter bellows in the region of the second inflow surface 56 is embodied thinner.

In this example, the filter element 10 with the filter bellows 12 is embodied as a flat filter in the form of a drawer filter element. For this purpose, the filter housing 110 comprises an insertion compartment 146 with a frame guide 158 for the filter element 10 by means of which the filter element 10 can be inserted through an insertion opening 144 of the filter housing 110 transversely to the flow direction 58 into the insertion compartment 146 so that a seal 40 of the filter element 10 rests circumferentially against a housing seal surface 160 and seal-tightly in an axial direction relative to the main flow axis 128 of the fluid. The flow direction 58 is parallel to the main flow axis 128. The flow direction 58, for example, is oriented here perpendicularly to the inflow surfaces 54, 56 and outflow side 68 or outflow surface. Preferably, outflow surface and inflow surface in a filter bellows 12 with erected folds 34 form the surfaces in which respectively the inflow-side and outflow-side fold edges 26 (FIG. 2) are positioned.

Optionally, other geometries of the filter element 10 instead of a flat filter can be provided also, for example, a stepped filter element.

In a housing bottom part 114 of the filter housing 110, a flow chamber 132 with a valve 116 for the second fluid flow 62 is provided. The valve 116 is arranged at the second inlet 106 and can be designed, for example, as a check valve. An inflow of the fluid through the valve 116 can be realized in this context by pressure control or controlled by a flow resistance. The valve 116 is however not mandatorily required for the function of the second inflow surface 56 as separate filtration region for an emergency operation when the first inflow surface 54 is clogged.

Figure 3:
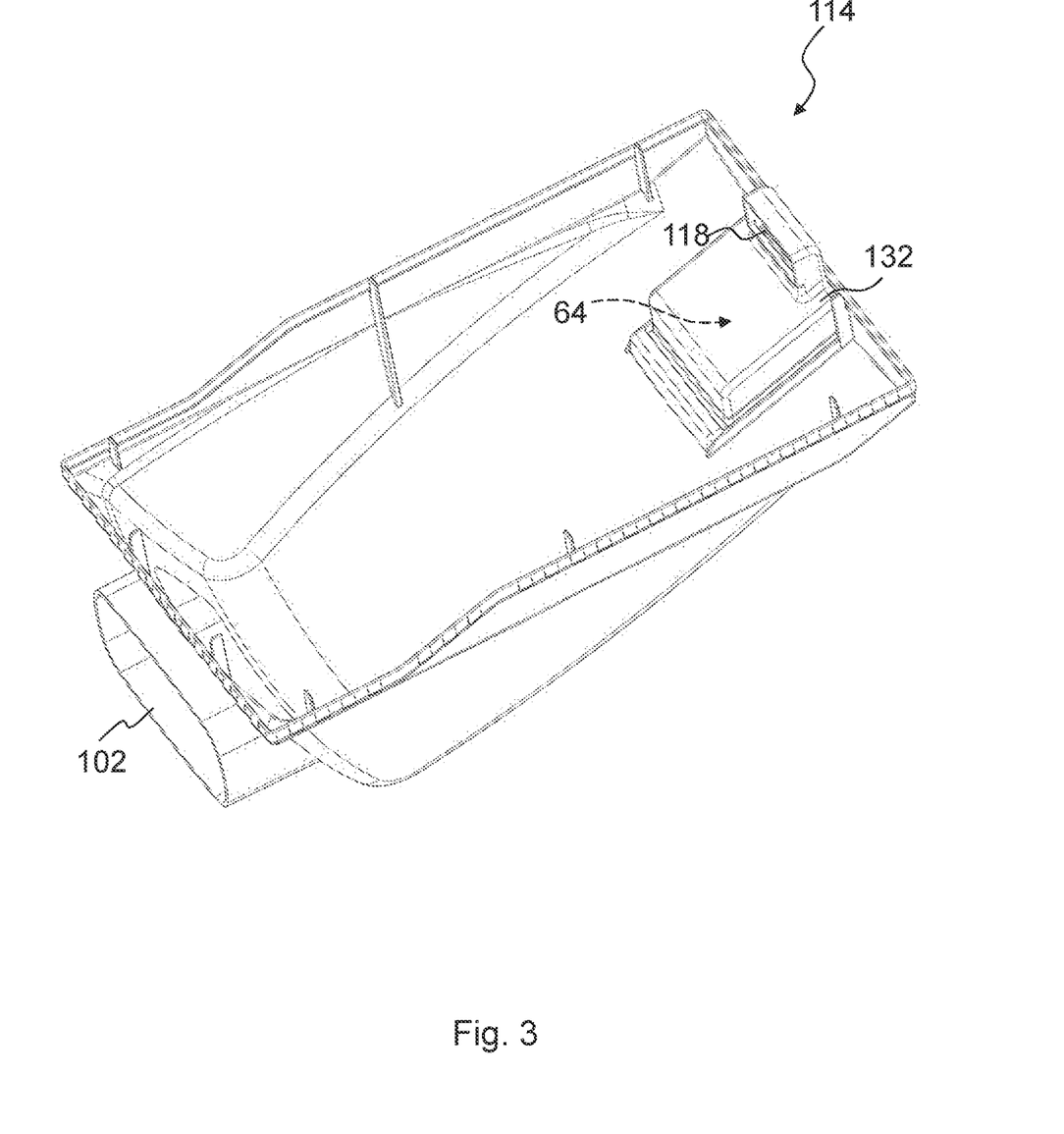
FIG. 3 shows an isometric illustration of the housing bottom part of the filter system according to FIG. 1.

FIG. 3 shows an isometric illustration of the housing bottom part 114 of the filter system 100 according to FIG. 1. The housing bottom part 114 comprises the inlet 102 of the fluid into the filter housing and comprises a flow chamber 132 which represents the flow channel section 64 through which a second fluid flow 62 (see FIGS. 1 and 2) via the inflow opening 118 can reach the flow channel 130 and thus the second inflow surface 56 of the filter element 10 through the compensation element 48.

Figure 4:
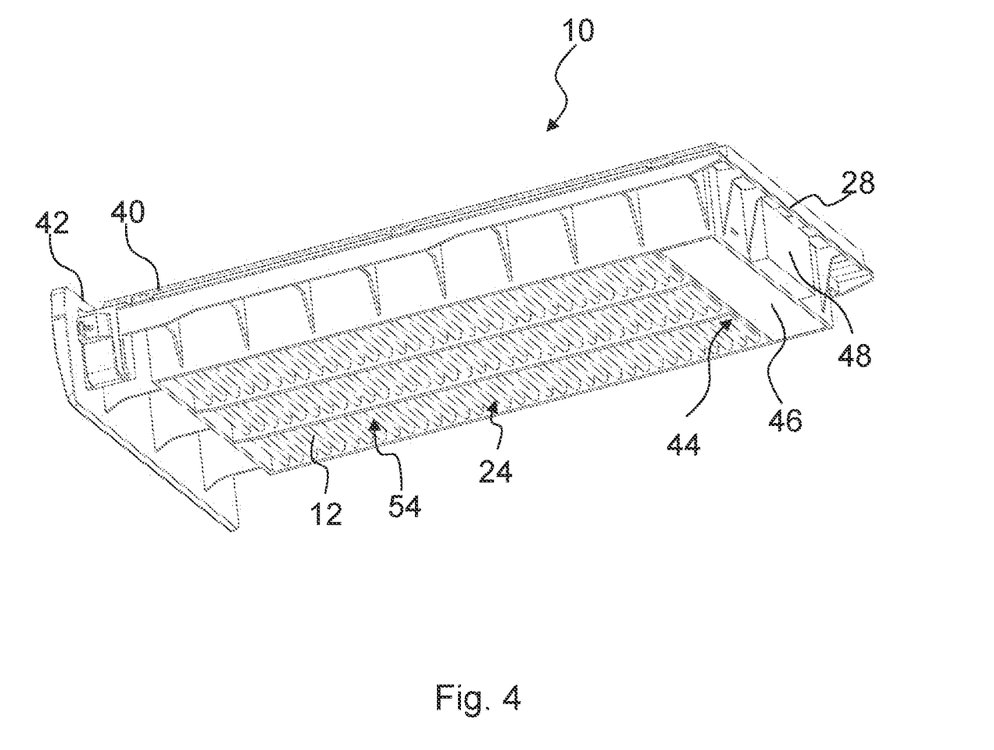
FIG. 4 shows an isometric illustration of the filter element of the filter system according to FIG. 1.
Figure 5:
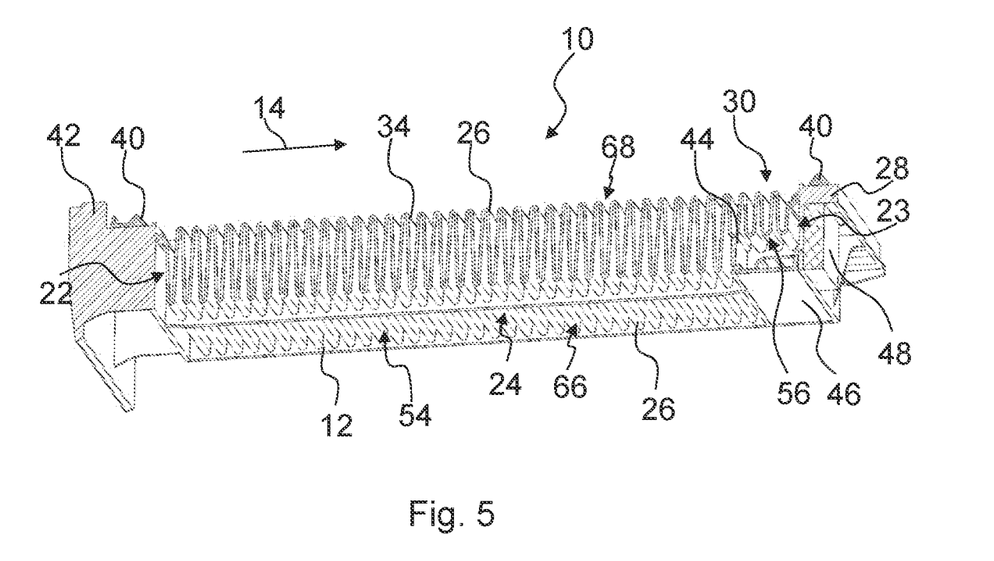
FIG. 5 shows a sectioned isometric illustration of the filter element of the filter system according to FIG. 1.

In FIG. 4, an isometric illustration of the filter element 10 of the filter system 100 according to FIG. 1 is shown while FIG. 5 shows a sectioned isometric illustration of the filter element 10. The filter element 10 is embodied as a flat filter in the form of a drawer filter element and, in addition to the molded-on plastic frame filter bellows 12, comprises at one end a closure element 42 with which an insertion opening 144 in the filter housing 110 is closed. The sealing action between raw side 50 and clean side 52 of the filter system is realized by the seal 40 which is arranged on the frame 28 and which seal-tightly contacts the housing seal surface 160 (FIG. 2) in the mounted state.

The filter bellows 12 of the filter element 10 is folded in a zigzag shape to folds 34 with parallel fold edges 26 embodied at the inflow side and outflow side, respectively, which sequentially follow each other in a longitudinal extension 14 between oppositely positioned end face edges 22, 23 of the filter bellows 12. The filter bellows 12 is circumferentially molded around by a continuous frame 28 of plastic material.

Figure 6:
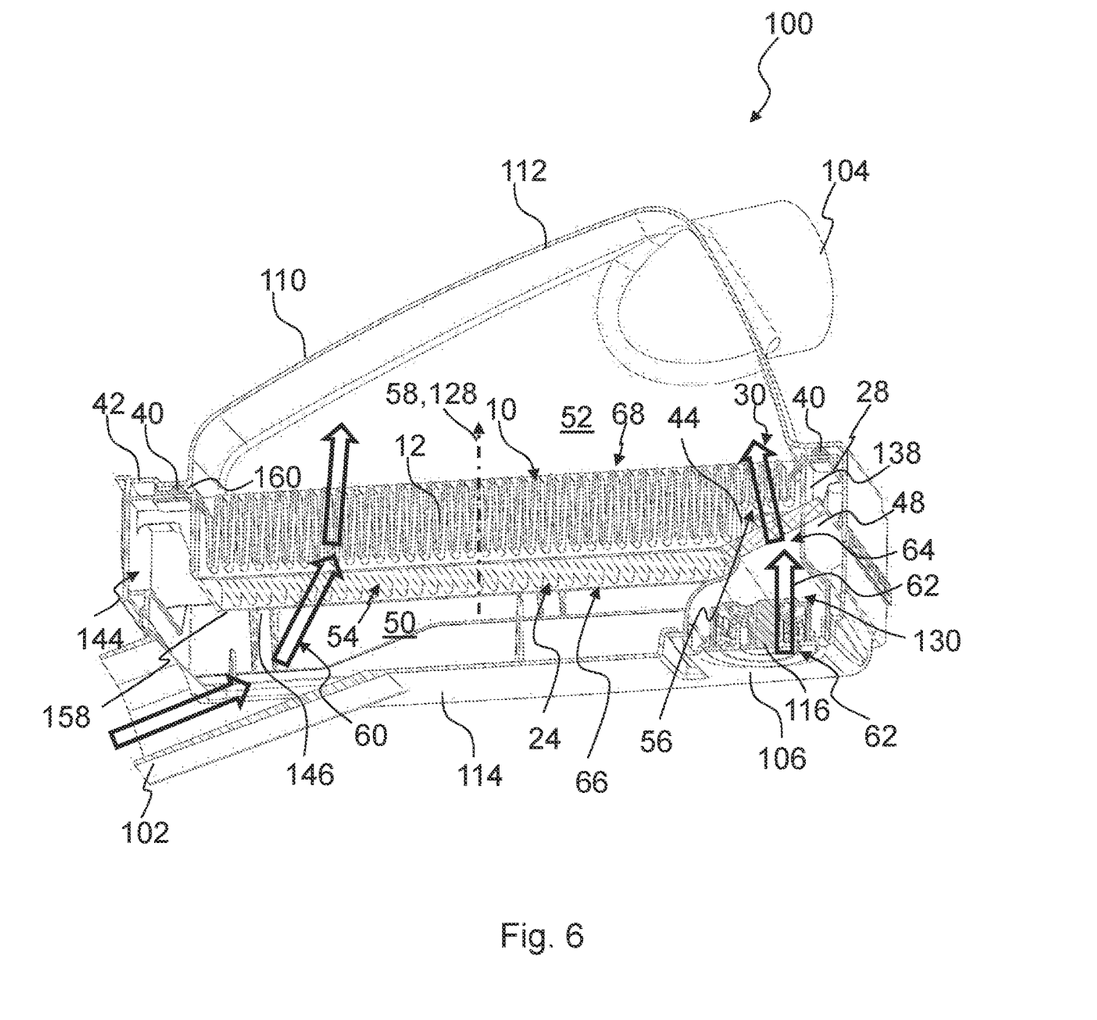
FIG. 6 shows a sectioned isometric illustration of a filter system with mounted drawer filter element according to an embodiment of the invention with an inflow via an end face of the filter element.
Figure 7:
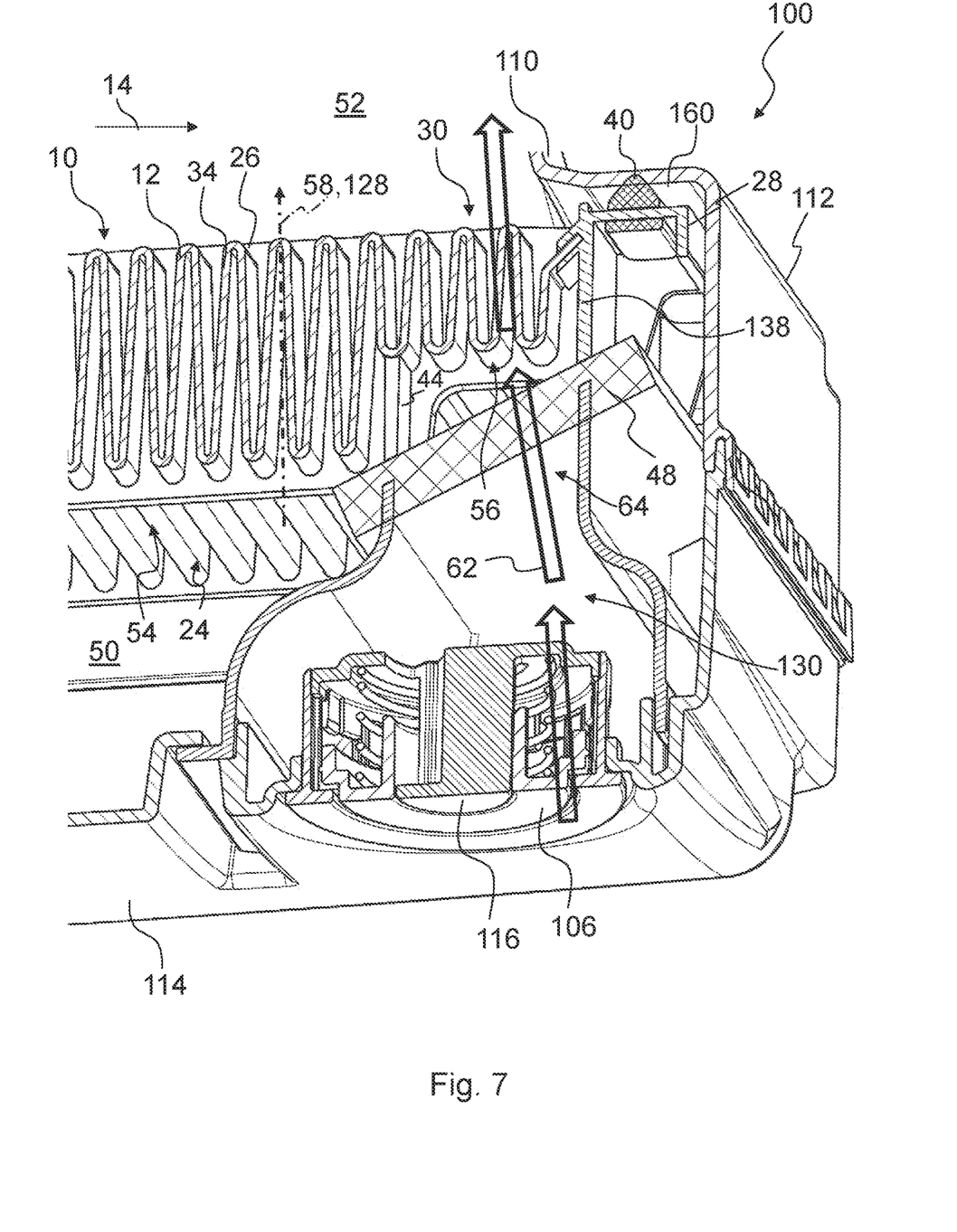
FIG. 7 shows a detail view of the filter system according to FIG. 6 in the region of the second inflow surface.

FIG. 6 shows a sectioned isometric illustration of a filter system 100 with mounted drawer filter element 10 according to an embodiment of the invention with an inflow via an end face 24 of the filter element 10 while in FIG. 7 a detail view of the filter system 100 in the region of the second inflow surface 56 is illustrated. In this context, the compensation element 48 is arranged at the end face 24 of the filter element 10 with a minimal slant relative to the inflow side 66. The flow channel 130 extends thus from the raw-side inlet 106 to the second inflow surface 56 across at least a part of the filter element end face 24. The fluid flows 60, 62 are indicated again by arrows. The first fluid flow 60 passes through the inlet 102 of the housing bottom part 114 into the filter housing 110 at the raw side 50 and flows then through via the first inflow surface 54 through the filter bellows 12 to the clean side 52. The second fluid flow 62 passes via the valve 116 into the flow chamber 132 (see FIG. 8) in the housing bottom part 114 and along the flow channel 130 and the flow channel section 64 through the compensation element 48 via the second inflow surface 56 through the filter bellows 12. Both fluid flows 60, 62 exit again through the outlet 104 from the filter housing 110.

Figure 8:
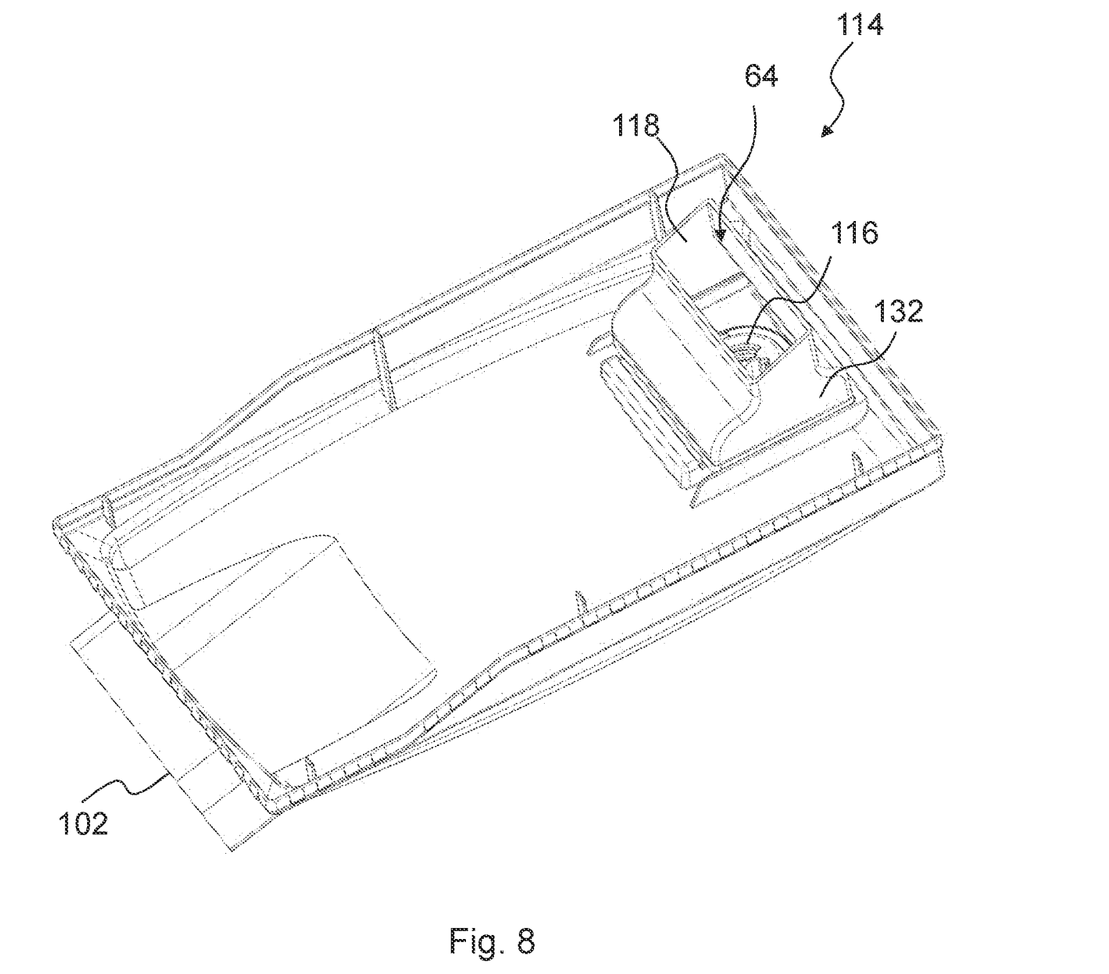
FIG. 8 shows an isometric illustration of the housing bottom part of the filter system according to FIG. 6.

The embodiment of the filter element 10 is embodied similar to the embodiment illustrated in FIGS. 1 through 5 with a separation element 44 parallel to the folds 34 of the filter bellows 12 which separates the first inflow region 54 from the second inflow region 56. In the embodiment illustrated in FIGS. 6 to 10, the inflow of the second inflow surface 56 is however realized directly from the bottom side of the filter bellows 12. The filter element 10 comprises therefore no cover element in this embodiment. The compensation element 48 is arranged between an opening 118 in the housing bottom part 114 on one side and the separation element 44 and the frame 28 on the opposite side. When the filter element 10 is mounted, the compensation element 48 adjoins directly the opening 118 of the filter housing bottom part 114 (FIG. 8). The valve 116 serves for inflow into the second flow channel 130.

FIG. 8 shows an isometric illustration of the housing bottom part 114 of the filter system 100 according to FIG. 6. The housing bottom part 114 differs in this embodiment from the embodiment of FIGS. 1 through 5 in that the inflow opening 118 of the flow chamber 132 faces upwardly and the flow channel section 64 is embodied directly in the flow chamber 132 because the filter element 10 is provided with direct inflow from below via its second inflow surface 56, as can be seen in FIGS. 6 and 7.

Figure 9:
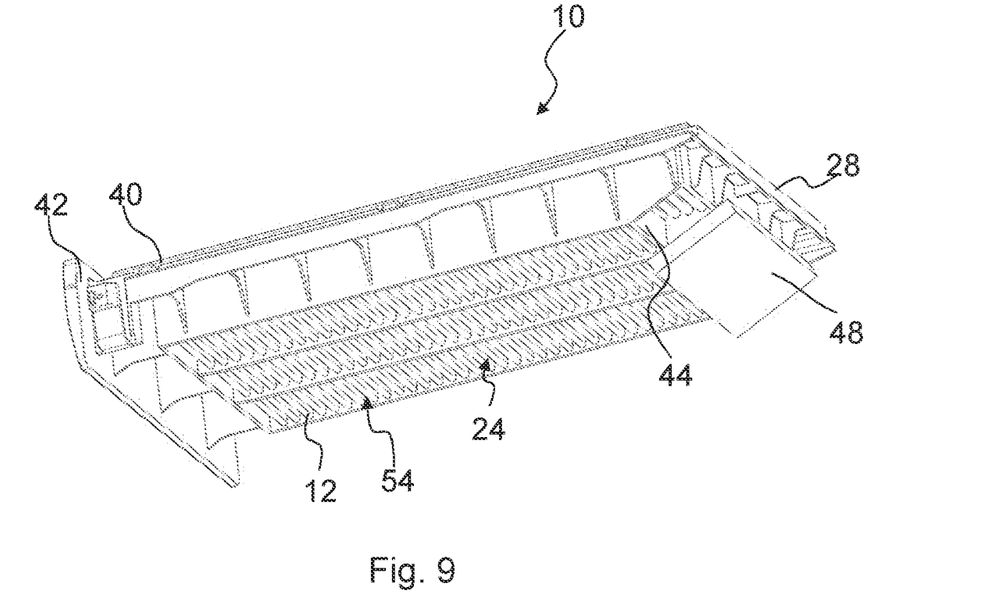
FIG. 9 shows an isometric illustration of the filter element of the filter system according to FIG. 6.
Figure 10:
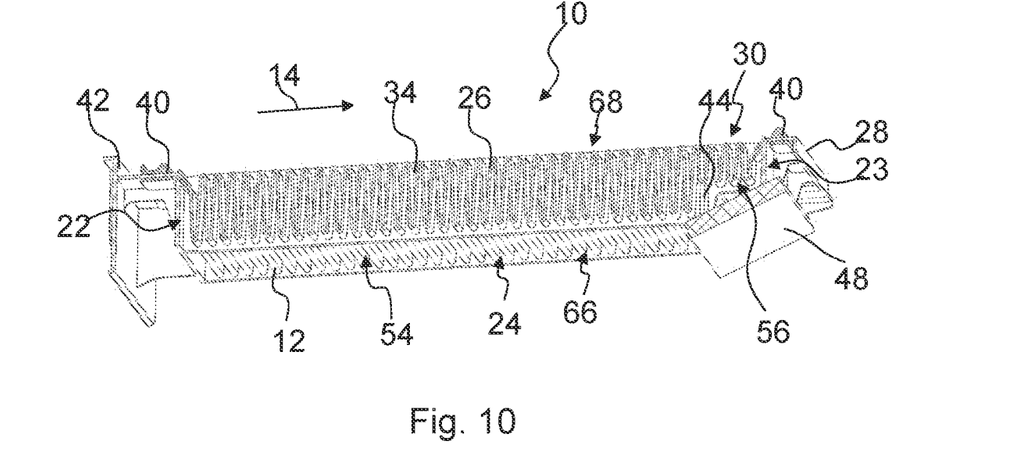
FIG. 10 shows a sectioned isometric illustration of the filter element of the filter system according to FIG. 6.

FIG. 9 shows an isometric illustration of the filter element 10 of the filter system 100 according to FIG. 6 while in FIG. 10 a sectioned isometric illustration of the filter element 10 is illustrated. One can see clearly the slanted arrangement of the compensation element 48 between separation element 44 and frame, which is connected to the separation element 44 and the frame 28 and, for example, can be glued on.

What is claimed is:

1. A filter element for filtering a fluid, the filter element comprising:
   at least one filter bellows comprising a first areal inflow surface for a first fluid flow of the fluid and at least one second inflow surface for a second fluid flow of the fluid separate from the first fluid flow of the fluid, wherein the at least one second inflow surface is separate from the first areal inflow surface, and wherein the at least one filter bellows defines a flow direction;
   a flow channel section for the second fluid flow of the fluid; and
   at least one compensation element arranged in the flow channel section for the second fluid flow of the fluid at a raw side of the filter element;
   wherein the at least one compensation element is flowed through by the second fluid flow of the fluid in a direction other than the flow direction; and
   wherein the at least one compensation element is connected to the at least one filter bellows.

2. The filter element according to claim 1, further comprising at least one separation element arranged between the first areal inflow surface and the at least one second inflow surface.

3. The filter element according to claim 2, further comprising a cover element for an areal coverage of the at least one second inflow surface, wherein the at least one separation element is connected fluid-tightly in relation to the first fluid flow of the fluid to the cover element for the areal coverage of the at least one second inflow surface.

4. The filter element according to claim 1, wherein the at least one compensation element is arranged in or at a rim segment of the filter element.

5. The filter element according to claim 1, wherein the at least one compensation element is arranged in or at an end face of the filter element.

6. The filter element according to claim 1, further comprising a continuous frame molded circumferentially around the at least one filter bellows, wherein the at least one filter bellows is folded in a zigzag shape to folds, wherein the folds comprise parallel fold edges arranged sequentially following each other in a longitudinal extension of the at least one filter bellows between oppositely positioned end face edges of the at least one filter bellows.

7. The filter element according to claim 6, wherein the at least one compensation element is connected to the continuous frame.

8. A filter element for filtering a fluid, the filter element comprising:
   at least one filter bellows comprising a first areal inflow surface for a first fluid flow of the fluid and at least one second inflow surface for a second fluid flow of the fluid separate the first fluid flow of the fluid, wherein the at least one second inflow surface is separate from the first areal inflow surface, and wherein the at least one filter bellows defines a flow direction;
   a continuous frame molded circumferentially around the at least one filter bellows;
   a flow channel section for the second fluid flow of the fluid; and
   at least one compensation element arranged in the flow channel section for the second fluid flow of the fluid at a raw side of the filter element;
   wherein the at least one compensation element is flowed through by the second fluid flow of the fluid in a direction other than the flow direction; and
   wherein the at least one compensation element is connected to the continuous frame and to the at least one filter bellows.

9. A filter system for filtering a fluid, the filter system comprising:
   a filter housing;
   a filter element for filtering the fluid arranged exchangeably in the filter housing between a raw side of the filter system and a clean side of the filter system;
   the filter element comprising at least one filter bellows comprising a first areal inflow surface for a first fluid flow of the fluid and at least one second inflow surface for a second fluid flow of the fluid separate from the first fluid flow of the fluid, wherein the at least one second inflow surface is separate from the first areal inflow surface;
   the filter housing comprising a first inlet for inflow of the first fluid flow of the fluid to the first areal inflow surface and at least one second inlet for inflow of the second fluid flow of the fluid to the at least one second inflow surface;
   at least one compensation element arranged at the raw side of the filter system upstream of the at least one second inflow surface; and
   a flow channel for the second fluid flow of the fluid extending through the at least one compensation element from the at least one second inlet for inflow of the second fluid flow of the fluid to the at least one second inflow surface;
   wherein the at least one compensation element is arranged at an angle relative to the at least one second inflow surface;
   wherein the at least one compensation element is flowed through by the second fluid flow of the fluid in a direction other than the flow direction; and
   wherein the at least one compensation element is connected to the at least one filter bellows.

10. The filter system according to claim 9, wherein the flow channel extends from the at least one second inlet for inflow of the second fluid flow of the fluid to the at least one second inflow surface across at least a part of an end face of the filter element and at least a part of a rim segment of the filter element.

11. The filter system according to claim 9, wherein the flow channel extends from the at least one second inlet for inflow of the second fluid flow of the fluid to the at least one second inflow surface via at least a part of a rim segment of the filter element.

12. The filter system according to claim 9, wherein the flow channel extends from the at least one second inlet for inflow of the second fluid flow of the fluid to the at least one second inflow surface across at least a part of an end face of the filter element.

13. The filter system according to claim 9, wherein the filter housing comprises a housing bottom part, wherein the housing bottom part comprises a flow chamber with a valve for the second fluid flow of the fluid.

14. The filter system according to claim 9, further comprising a valve arranged at the at least one second inlet.

15. The filter system according to claim 9, wherein the filter housing comprises an insertion compartment with a frame guide and further comprises an insertion opening, wherein the frame guide is configured to guide the filter element when inserted through the insertion opening into the insertion compartment so that a seal of the filter element rests circumferentially against a housing seal surface of the filter housing and seal-tightly in an axial direction relative to a main flow axis of the fluid through the filter element.

16. The filter element according to claim 1, wherein the at least one compensation element is arranged in the flow direction.

17. A filter element for filtering a fluid, the filter element comprising:
- at least one filter bellows comprising a first areal inflow surface for a first fluid flow of the fluid and at least one second inflow surface for a second fluid flow of the fluid separate from the first fluid flow of the fluid, wherein the at least one second inflow surface is separate from the first areal inflow surface, and wherein the at least one filter bellows defines a flow direction;
- a flow channel section for the second fluid flow of the fluid; and
- at least one compensation element arranged in the flow channel section for the second fluid flow of the fluid at a raw side of the filter element;
- wherein the at least one compensation element is flowed through by the second fluid flow of the fluid in a direction other than the flow direction; and
- wherein the at least one compensation element is arranged at a slant relative to the at least one second inflow surface between a frame of the at least one filter bellows and a separation element that is arranged between the first areal inflow surface and the at least one second inflow surface.

18. The filter system according to claim 9, wherein the at least one filter bellows defines a flow direction of the fluid and wherein the at least one compensation element is arranged in the flow direction.

19. A filter system for filtering a fluid, the filter system comprising:
- a filter housing;
- a filter element for filtering the fluid arranged exchangeably in the filter housing between a raw side of the filter system and a clean side of the filter system;
- the filter element comprising at least one filter bellows comprising a first areal inflow surface for a first fluid flow of the fluid and at least one second inflow surface for a second fluid flow of the fluid separate from the first fluid flow of the fluid, wherein the at least one second inflow surface is separate from the first areal inflow surface;
- the filter housing comprising a first inlet for inflow of the first fluid flow of the fluid to the first areal inflow surface and at least one second inlet for inflow of the second fluid flow of the fluid to the at least one second inflow surface;
- at least one compensation element arranged at the raw side of the filter system upstream of the at least second inflow surface; and
- a flow channel for the second fluid flow of the fluid extending through the at least one compensation element from the at least one second inlet for inflow of the second fluid flow of the fluid to the at least one second inflow surface;
- wherein the at least one compensation element is arranged at an angle relative to the at least one second inflow surface; and
- wherein the at least one filter bellows defines a flow direction of the fluid and wherein the at least one compensation element is arranged at a slant relative to the flow direction between a frame of the at least one filter bellows and a separation element arranged between the first areal inflow surface and the at least one second inflow surface.

20. The filter element according to claim 1, wherein the filter element further comprises a continuous frame molded circumferentially around the at least one filter bellows, wherein the at least one compensation element is further connected to the continuous frame, and wherein the at least one compensation element is arranged in the flow direction or at a slant relative to the at least one second inflow surface.

* * * * *